Dec. 19, 1961     E. V. GARNETT     3,013,681
DEVICE FOR STORAGE OF ELONGATED ARTICLES ON A VEHICLE
Filed Oct. 12, 1959     7 Sheets-Sheet 1

INVENTOR.
EDWARD V. GARNETT
BY
ATTORNEY

Dec. 19, 1961      E. V. GARNETT      3,013,681
DEVICE FOR STORAGE OF ELONGATED ARTICLES ON A VEHICLE
Filed Oct. 12, 1959      7 Sheets-Sheet 2

INVENTOR.
EDWARD V. GARNETT
BY
Horace B. Van Valkenburgh
ATTORNEY

Dec. 19, 1961 E. V. GARNETT 3,013,681
DEVICE FOR STORAGE OF ELONGATED ARTICLES ON A VEHICLE
Filed Oct. 12, 1959 7 Sheets-Sheet 3

INVENTOR.
EDWARD V. GARNETT
BY
ATTORNEY

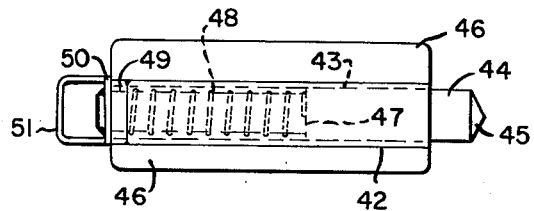
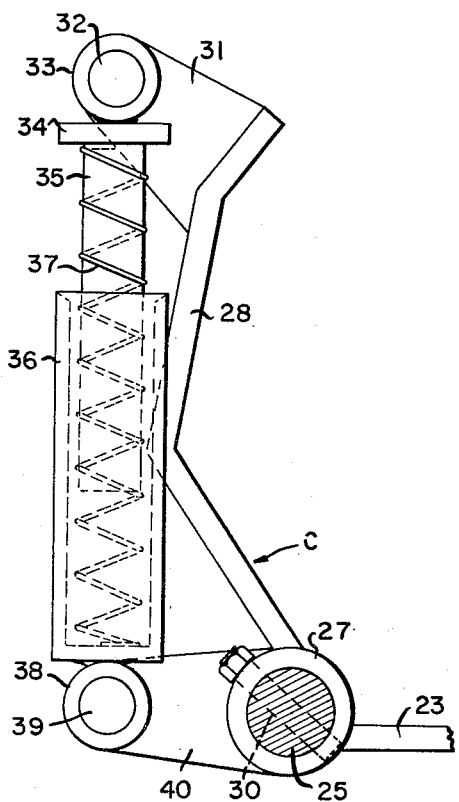

Dec. 19, 1961  E. V. GARNETT  3,013,681
DEVICE FOR STORAGE OF ELONGATED ARTICLES ON A VEHICLE
Filed Oct. 12, 1959  7 Sheets-Sheet 5

INVENTOR.
EDWARD V. GARNETT
BY
ATTORNEY

Dec. 19, 1961 E. V. GARNETT 3,013,681
DEVICE FOR STORAGE OF ELONGATED ARTICLES ON A VEHICLE
Filed Oct. 12, 1959 7 Sheets-Sheet 6

INVENTOR.
EDWARD V. GARNETT
BY
Horace B. Van Valkenburgh
ATTORNEY

United States Patent Office 3,013,681
Patented Dec. 19, 1961

3,013,681
DEVICE FOR STORAGE OF ELONGATED
ARTICLES ON A VEHICLE
Edward V. Garnett, 3963 Walnut St., Denver, Colo.
Filed Oct. 12, 1959, Ser. No. 845,690
16 Claims. (Cl. 214—450)

This invention relates to a device for storage of elongated articles, such as ladders, on a vehicle to permit storage in a locked but releasable position as atop the vehicle, and ready access to the article for use.

The ladder to be stored, as for transportation, should be disposed in a position which produces no interference with normal access to any door or the like of the vehicle in storage position atop the vehicle, such as a panel type truck. Thus, stationary brackets atop a vehicle have been provided for storage of a ladder, but such storage requires that the ladder be lifted atop the vehicle for storage and be lifted down for use. A ladder may also be stored on edge, in stationary brackets mounted on one side of the vehicle, so that the ladder need not be supported at a position higher than the shoulder of a workman, for either placement for storage or removal for use. Quick release clamps have often been associated with such brackets, for clamping the ladder in place during storage and for easy release when it is desired to remove the ladder from the storage position and to put it to use. However, if the ladder has any appreciable length, it will interfere with normal opening of a cab door on that side, or also a storage compartment door on that side. In addition, the capacity of such side racks is usually limited to one ladder.

Among the objects of the present invention are to provide a novel device for the storage of an elongated article or articles on a vehicle; to provide such a device on which an article may be rapidly yet securely placed in position for storage; to provide such a device on or from which such an article may be placed or removed at a height which does not involve an undue amount of lifting or lowering of the weight of the article; to provide such a device in which, with such an article in storage position, neither the device nor the article interferes with the effective use of the vehicle; to provide such a device in which certain operations are automatically produced by other operations; to provide such a device which may exist in more than one form; and to provide each such form which is easily manipulated and is dependable and reliable in operation.

In accordance with the present invention, such a device is adapted to clamp the article and store it atop a vehicle and includes a pivotal rack assembly constructed and arranged to be moved between a lower position for easy displacement or removal of the article and a substantially upright, out of the way storage position atop the vehicle. Such rack assembly includes means for locking the article to the rack assembly and means for locking the rack assembly in overhead storage position when the rack assembly is moved thereto. Such a device also includes resilient means for counterbalancing the weight of the article and means for unloading the rack assembly and moving the same to a lower position in a single operation.

Other objects and the novel features and advantages of the present invention will become apparent from the following description, taken in connection with the accompanying drawings, in which:

FIG. 5 is a fragmentary vertical section, on an enlarged scale and taken from the position of line 5—5 of FIG. 4, showing particularly a toggle type clamping device which forms a portion of the rack of FIG. 4;

FIG. 6 is a side elevation, on an enlarged scale, of a locking bolt assembly forming a part of the rack assembly of FIG. 4;

Figure 1:
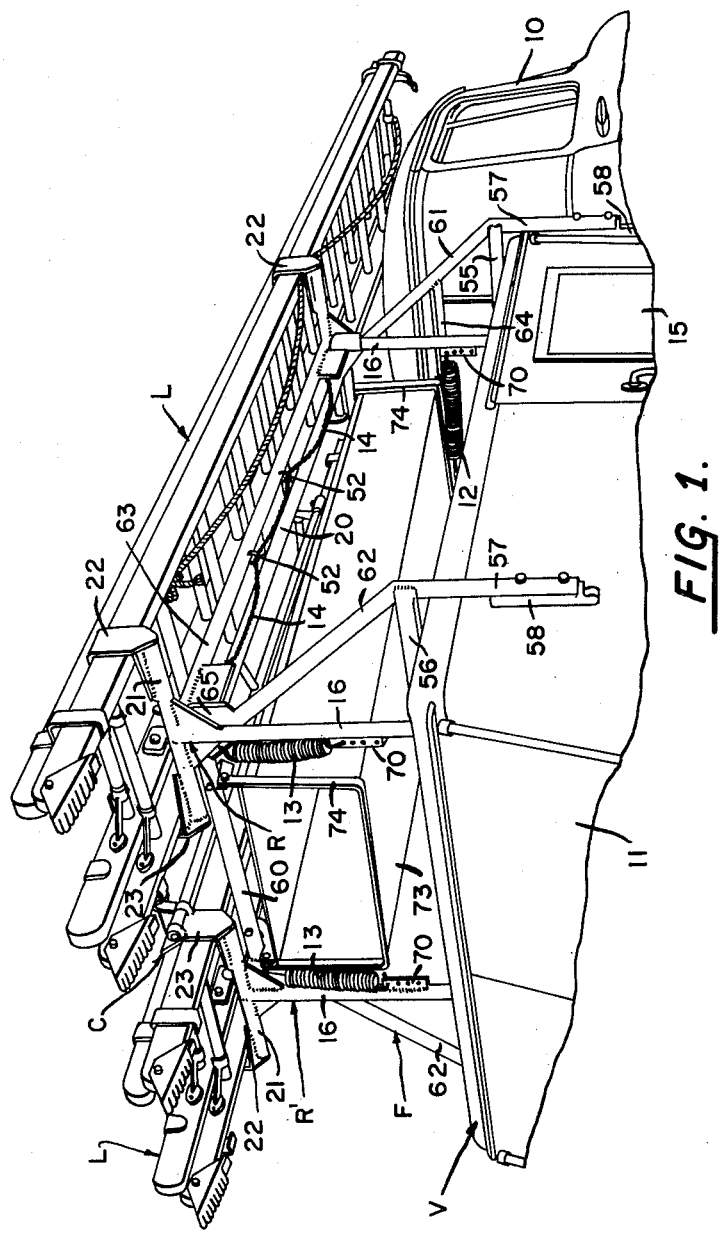
FIG. 1 is a rear perspective view of a device constructed in accordance with the present invention, showing a pair of extensible ladders in storage position and the device mounted on a panel type truck, the upper portion of which is shown.
Figure 2:
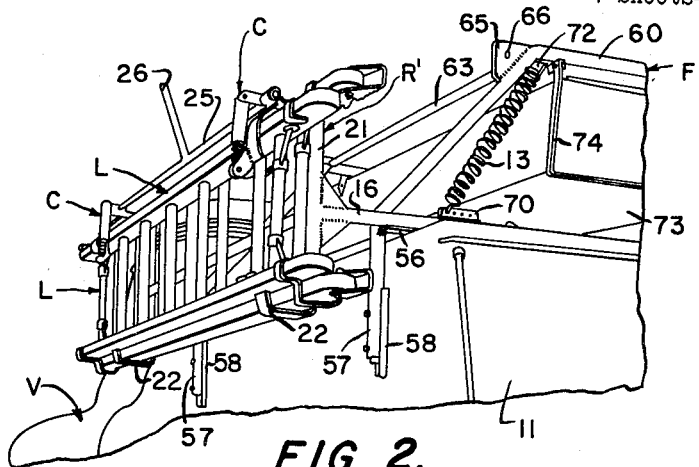
FIG. 2 is a rear perspective view of one side or half of the device of FIG. 1, showing a rack assembly and a ladder on that side moved to a lower or ladder unloading position.
Figure 3:
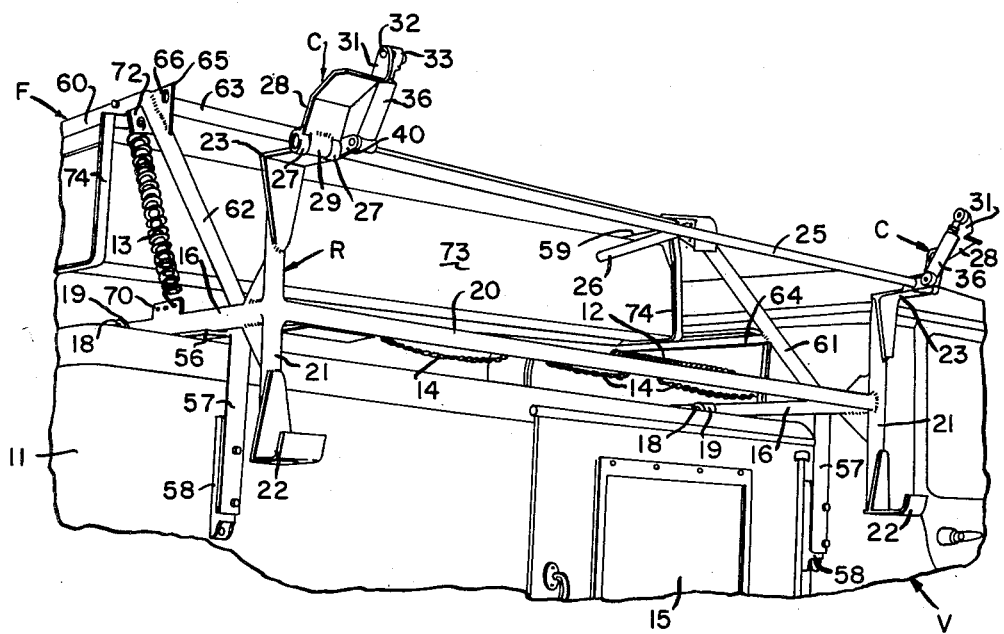
FIG. 3 is a rear perspective view of the opposite half of the device, after the ladder has been removed therefrom.

Referring more particularly to FIGS. 1 to 7 of the drawings, a preferred form of the present invention is shown as mounted atop a vehicle V, such as a panel type truck having a cab 10 and a body or panel section 11, although the device, of course, is capable of being mounted on various other types of vehicles including automobiles, other types of trucks, trailers and the like. In the form shown, the device of the present invention includes a pair of pivotally mounted ladder racks R and R' extending along opposite sides of the upper portion of the vehicle panel 11 and supported by a stationary frame F, mounted on and attached to the panel section. As shown in FIG. 1, a pair of ladders L, such as collapsed extension ladders of a conventional type, are supported in storage position above panel 11 and also may extend forwardly over cab 10, with each ladder being locked to the respective rack R and R' in an upright position of the latter, each rack R and R' also being locked to frame F. Each rack may be unlocked and moved to a lower position alongside panel 11, as shown in FIG. 2, and the ladder unlocked from the rack by shifting a toggle clamp C at each end of the rack to open position, and the ladder then removed, as shown in FIG. 3. With a rack in the position of FIG. 2, ladder L is supported at about shoulder height, which is convenient for removal of the ladder and moving the ladder to a place of use, while the ladder may readily be replaced in the rack, with the latter in the position of FIG. 3. After the ladder has been replaced in the rack, the toggle clamps C are thrown to the closed or locked position of FIG. 2, whereupon the rack with the ladder locked thereto is shifted to the upper position of FIG. 1, such movement being assisted by counterbalancing springs 12 and 13 connected between frame F and rack R or R' at the respective front and rear ends of the latter. When rack R or R' is moved from the lower position of FIG. 2 to the upper position of FIG. 1, the rack is automatically locked to frame F, in a manner described later. Also, a single operation will both unlock the rack R or R' from the frame and pull the rack to the lower position of FIG. 2, this being accomplished by pulling on a chain 14 to unlock the rack in a manner described later, continuation of the pull on chain 14 moving the rack assembly to the lower position of FIG. 2. As will be evident, all of these operations can be carried out by a workman standing on the ground, thus eliminating the necessity of climbing onto or on top of the vehicle to store or lock, or unload or unlock, the ladder. As will be further evident, with the ladders in storage position above panel 11 and extending over cab 10, if necessary because of the length of the ladders, even when collapsed, free access to the cab doors and also to a panel side door 15 is obtainable. As will also be evident, either one or a pair of racks may be employed, although by using a pair of racks mounted at opposite sides of the vehicle, the racks will serve to counterbalance one another and more evenly distribute the weight of their load on the vehicle. As will further be evident, elongated articles other than ladders may be stored on the device of this invention.

As shown in FIGS. 1–4, each rack R and R' includes a post 16 extending substantially at right angles to the axis of the vehicle and disposed at each of the front and rear ends of the rack. At its inner end, each post 16 is pivotally connected in a suitable manner to frame F, such as by a tubular socket 17, shown in FIG. 4, attached to the inner end of the post and receiving a pin 18 extending through a bracket plate 19 of the frame F at positions corresponding to each post 16, as in FIG. 3. The outer end of each post 16 is attached to one end of a longitudinal reinforcing bar 20, which connects the outer ends of the two posts 16 of each rack, and also to a transverse arm 21 which is perpendicular to the longitudinal bar 20 and to the post 16. Conveniently, the posts 16, bar 20 and arm 21 are formed of tubular members, the connections between which may be reinforced by gussets, as shown, and the attachment made in a suitable manner, as by welding. Each transverse arm 21, as in FIG. 3, is provided at the extremity corresponding to the lower end when the rack is in the lower position of FIG. 3, with a generally U-shaped bracket 22 adapted to receive one side of the ladder L and at the other extremity with an angular bracket 23 on which the toggle clamp C is mounted. Brackets 22 and 23 are attached to arms 21 in a suitable manner, as by welding. Bar 20 may be provided with a handle 24, as in FIG. 4, for use in moving the rack from the lower position of FIG. 2 to the upper position of FIG. 1, while the toggle clamps C are operated in unison by a rod 25 provided with a centrally disposed handle 26, which is disposed at an appropriate radial angle to clear the opposite ladder L when in storage position and to be thrown inwardly readily for unlocking purposes when the rack is in the lower position of FIG. 2. Preferably, the handles 26 of the opposite racks are placed at different longitudinal positions, to avoid interference with each other when in storage position. Rod 25 is pivotally mounted at its ends in spaced bearings 27 mounted on the outer end of each of the respective brackets 23.

As in FIGS. 3 and 5, each toggle clamp C includes an obtusely angled clamping plate 28 provided at its inner end with a generally circular extension or tongue 29 extending between bearings 27 around rod 25 and conveniently locked to rod 25 by a bolt 30, as in FIG. 5. At its outer inside corner, plate 28 is provided with a right angle ear 31, which provides a point for attachment of a pin 32 which engages a bearing 33 attached to a head 34 of a rod 35. Rod 35 extends within a sleeve 36 and is surrounded by a coil spring 37, one end of which engages head 34 and the opposite end of which engages the opposite end of sleeve 36, which is closed. The closed end of sleeve 36 is provided with a bearing 38, which may be welded to sleeve 36 and engages a pin 39 mounted on an ear 40 extending outwardly from bracket 23. Each of brackets 21 and 23, as well as clamping plate 28, may be provided with a lining of rubber or the like, not shown, to provide in a well-known manner resilient cushions to prevent damage to a ladder when the vehicle is in motion.

As will be evident from the respective positions of the toggle clamps C shown in FIGS. 2 and 3, the plates 28 may be synchronously operated to move either to an inwardly biased, closed position clamping the ladder L in place, or to an outwardly biased, open position to permit removal of the ladder. Thus, the axis of pin 39 is offset from the axis of rod 25 and disposed in such relation thereto, that only when the clamp is being rotated through an intermediate position, between the open and closed positions or vice versa, will rod 35 be moved inwardly against the force of the spring 37 and in each of the open and closed positions, it is necessary to compress spring 37 in order to move the toggle clamp to the opposite position. Thus, spring 37 will hold the toggle clamp in open position and will maintain plate 28 clamped against the side of the ladder when in closed position.

Figure 4:
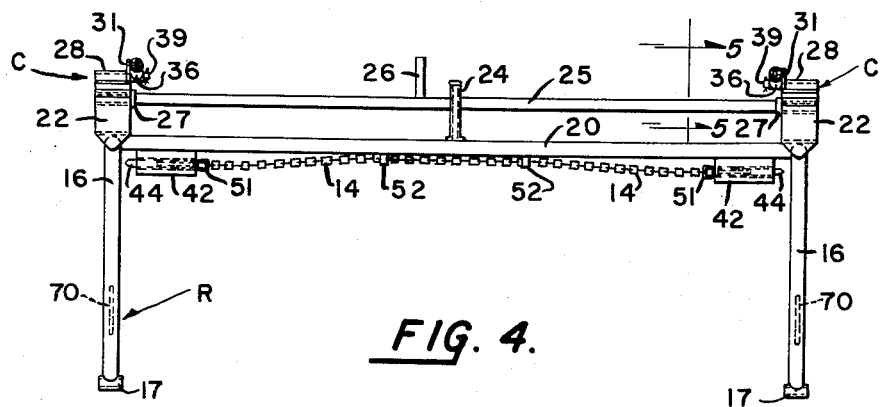
FIG. 4 is a side elevation of a rack forming a part of the device of FIG. 1.

Means are provided on each rack R and R' and stationary frame F for engagement, when a rack is moved from the lower or loading and unloading position to the upper or upright storage position, to automatically lock and hold the rack securely to the stationary frame. The portion of such locking means on each rack comprises a bolt assembly, one of which is shown in greater detail in FIG. 6, disposed at opposite ends of the rack. Such bolt assembly includes a housing 42 provided with a longitudinal bore 43, for sliding movement of a bolt 44 having a beveled extending end 45, and concave flanges 46 adapted to be attached, as by welding, to the under side of the longitudinal bar 20. For an appropriate length, the opposite end of bolt 44 is of reduced diameter to provide a shoulder 47 and to accommodate a coil spring 48, which bears at one end against shoulder 47 and at its opposite end against a ring 49 attached, as by welding, in a cutaway portion of housing 42 at the end of bore 43. The opposite end of bolt 44 also extends from the housing 42, while a ring 50 is attached to this end of the bolt, as by welding, ring 50 having a generally U-shaped hook 51, which with ring 50 forms a closed loop to which chain 14 of FIGS. 1 and 4 may be attached. To support the chain at intermediate points along bar 20, eyelets or guides 52 are attached to the underside of bar 20 at appropriate positions, such as shown in FIG. 4.

Figure 7:
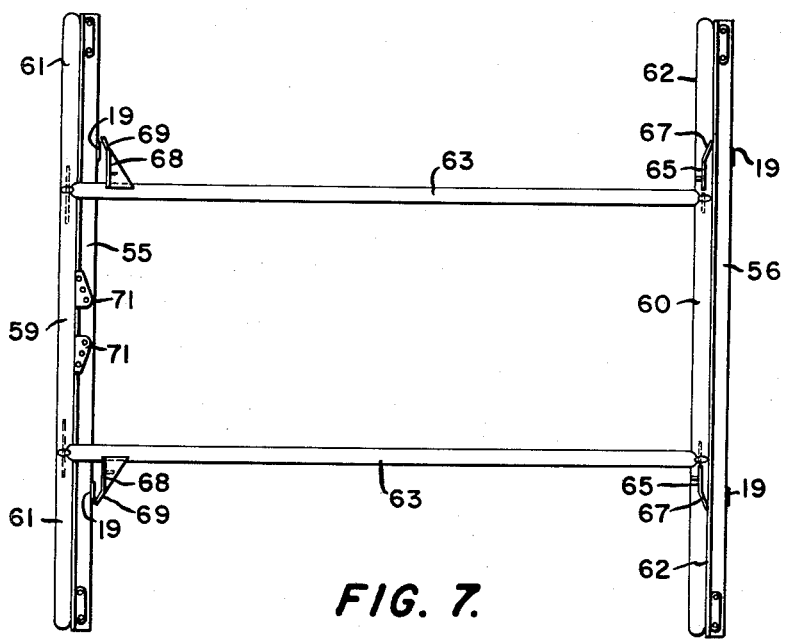
FIG. 7 is a top plan view of a frame which is mounted atop the vehicle and on which the rack assemblies are mounted.

The frame F is mounted on the vehicle to serve as a stationary support for the pivotal racks R and R' and, as shown in FIGS. 2, 3, and 7, includes front and rear lower bars 55 and 56, extending transversely of and spaced slightly above the top of panel 11 and conveniently formed of angles, as shown. Bars 55 and 56 are supported by a post 57 at each end, which extends downwardly alongside the panel and is connected, as by bolts, to a supporting bracket 58 mounted on the side of panel 11. Upper bars 59 and 60 are disposed in parallel relation above, but spaced slightly forwardly of the position of the respective lower bars, with the ends of bars 59 and 60 connected to the corresponding ends of the lower bars by outwardly and downwardly extending side struts 61 and 62, which may be integral with the respective upper bars. For reinforcement purposes, longitudinal struts 63 extend between the respective ends of the upper bars 59 and 60, while a front strut 64 extends transversely between the forward side struts 61. Each plate 19 may be attached in upright position, as by welding, to the lower flange of each bar 55 and 56, at an appropriate position so that the respective pin 18 for pivotal movement of the respective rack may extend between plate 19 and the upright flange of bar 55 or 56, through holes provided for pin 18.

To provide means on the frame for cooperation with the locking bolts of FIG. 6, an upright triangular plate 65 is attached, as by welding, to the upper end of each rear side strut 62, as in FIGS. 2 and 3, provided with a hole 66 for engagement with the end 45 of bolt 44. As in FIG. 7, the plate 65 may be provided with an angular flange 67 to push bolt 44 inwardly as it moves to locking position. A bracket 68, provided with a similar hole and a similar flange 69, may be attached to each longitudinal strut 63 adjacent the front end thereof. Springs 12 and 13 are connected between the frame and the posts 16 of the racks, as by connection of one end of each spring to a flange 70 extending at an intermediate position from the respective post 16 and provided with a series of openings to permit adjustment of the spring simply by inserting the spring end in a desired opening. The opposite end of the respective spring 12 may be inserted in one of a series of holes in a plate 71 of FIG. 7, extending from the front lateral strut 64 of FIG. 3 at an appropriate position, while the opposite end of the respective spring 13 may be inserted in one of a series of holes in a flange 72 extending from each inclined strut 62 adjacent the upper end thereof, as in FIG. 3. As will be evident, spring 13 exerts a greater pull with the rack in the lower position of FIG. 3, while spring 12 exerts a greater pull as the rack approaches the upper or storage position, while at an intermediate position, each exerts a relatively strong pull, thus counterbalancing the weight of the rack with the ladder thereon, but without tending to pull the rack back up to storage position when the weight of the ladder is removed. Thus, after the ladder has been replaced, a greater force is required to start the rack back to storage position, but as the rack moves upwardly, less force is required. As will be evident, a workman can readily exert a greater lift upwardly on an object not more than shoulder high, than on one overhead. It will be evident, of course, that other and different spring arrangements can be utilized to achieve the desired purpose. Additional storage space may be provided by an open ended box 73 suspended from bars 55 and 56 of frame F by straps 74, as in FIG. 1.

With the rack R or R' in the storage position of FIG. 1, when the chain 14 is grasped and pulled outwardly at an intermediate point between eyelets 52, the bolt 44 of each respective bolt assembly will be moved inwardly in the bore against the force of the spring 48. Also, as the rack assembly is moved into a substantially upright position, the tapered ends of bolts 44 will be forced inwardly upon engagement with the edge of the respective lock plates 65 and 68, or flanges 67 and 69 thereof, and upon alignment with the bolt receiving holes or openings 66, the bolts will spring outwardly into locking position. To carry out either the ladder removal operation or ladder storage operation, it will be evident from the above that only two operations are necessary for either. Thus, ladder removal involves releasing the bolts by means of the chain 14 and simultaneously pulling the rack assembly downwardly to the lower position; and second, releasing the toggle clamp C, simply by pushing upwardly and inwardly on handle 26, so as to simultaneously swing both clamps into an open position. The above two steps are readily accomplished and the ladder is then in a readily accessible position for removal from the rack. It will also be apparent that the rack assembly may be swung downwardly to any desired intermediate position. Of course, in the preferred form shown, the extent of downward movement will be limited by engagement of posts 16 with the flat surface of the lower flange of the respective bar 55 and 56, when the bars, for instance, are angles as shown. For replacement of the ladder in storage position, one side of the ladder is placed on the brackets 22 and the opposite side of the ladder is moved against brackets 23. Then, two operations only are necessary for storing, i.e., first closing toggle clamps C by pulling downwardly and outwardly on handle 26; and, second, pushing the rack upwardly into storage position, where it will automatically be locked to the frame, as described above.

Figure 8:
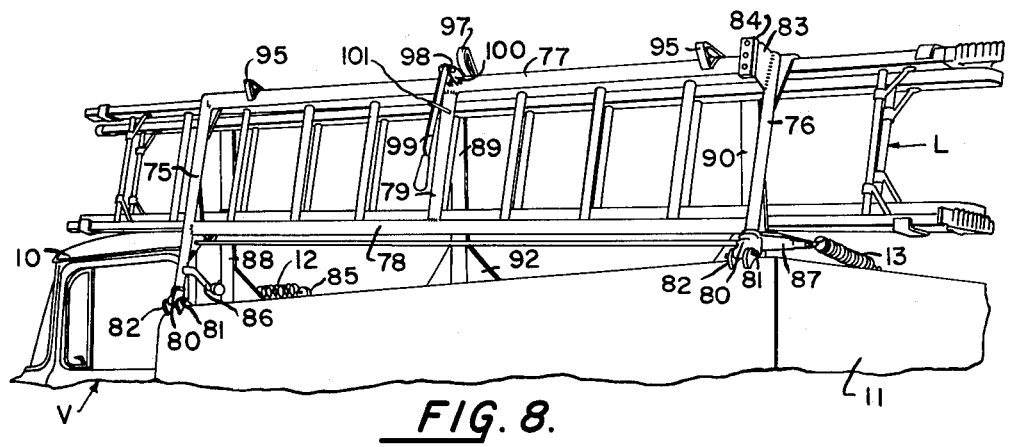
FIG. 8 is a rear perspective view of an alternative embodiment of the present invention, showing a ladder mounted in storage position and the upper portion of a panel type truck on which the device is mounted.
Figure 9:
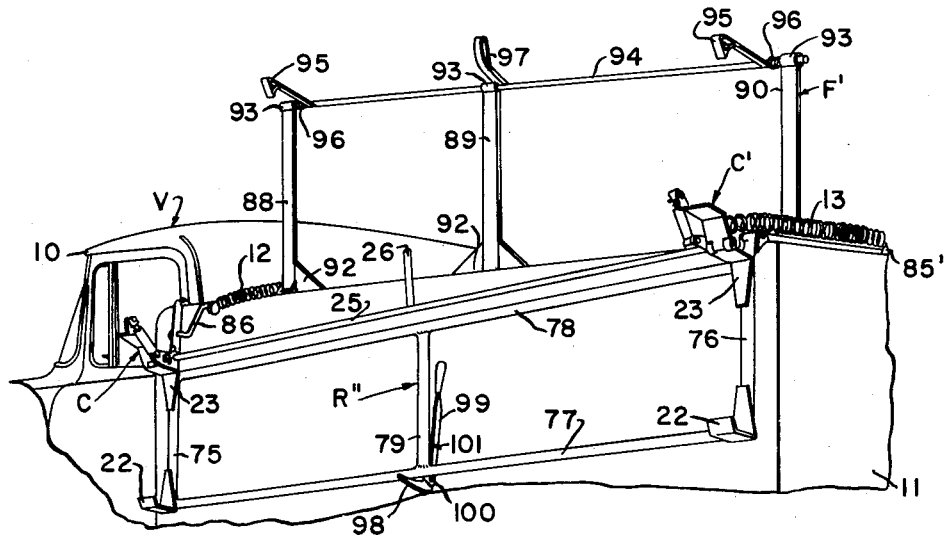
FIG. 9 is a perspective view similar to FIG. 8, but showing the device following removal of the ladder therefrom.

The embodiment of the present invention illustrated in FIGS. 8 and 9 comprises a pivotal rack R" and an upstanding stationary frame F', as in FIG. 9, on one side of a vehicle V, although it will be understood that a similar rack and frame may be mounted on the opposite side of the vehicle, such as a panel type truck having a cab 10 and a panel body 11. The rack R" may be formed by generally tubular members or the like, including front and rear arms 75 and 76, each pivoted about a horizontal axis on the panel or on the frame F' at the upper edge of panel 11, with front arms 75 being longer than rear arms 76 so that, when a ladder L is mounted on the rack and the rack is moved upwardly to storage position, as in FIG. 8, the front end of the ladder will extend above the door of the cab 10, to permit a relatively long ladder to be stored in the rack and still permit the cab door to be opened and closed. An outer longitudinal bar 77 may extend between the outer ends of arms 75 and 76, while an inner longitudinal bar 78 may extend, in generally parallel spaced relation to bar 77, between the inner end of arm 76 and an intermediate position on arm 75. The rack structure may be reinforced by a bar 79, disposed centrally of and extending between the longitudinal bars 77 and 78, while the arms 75, 76 and bars 77, 78, 79 may be attached together in a suitable manner, as by welding. The inner end of each arm 75 and 76, as in FIG. 8, is provided with a collar 80, pivotal about a pin 81 mounted in a bracket 82 of frame F' or separately mounted on the upper portion of panel 11 at an appropriate position. A plate 83 may be attached, as by welding, to the outside of the outer end of rear arm 76, so as to extend outwardly therefrom in the position of FIG. 8, and may be provided with a pad 84 of resilient material to engage the side of the panel 11 and prevent damage thereto when the rack is moved to the down position of FIG. 9. The weight of the ladder on the rack may be counterbalanced by a front spring 12 and a rear spring 13, the inner ends of which may be attached to a portion of frame F', or to a bracket mounted on the top of panel 11, such as bracket 85 of FIG. 8 for the front spring 12 and a bracket 85' of FIG. 9 for the rear spring 13. The outer end of the front spring 12 may be connected to the front arm 75 through an angular arm 86 which conveniently has the configuration shown, so that spring 12 will provide a direct pull on the rack when in the upper position, but will produce a minimum of engagement of the spring with the panel 11 when the rack is moved to the down position of FIG. 9. The outer end of rear spring 13 may be connected to an arm 87 of FIG. 8, extending at slightly less than a right angle to the rear rack arm 76 and connected thereto adjacent the inner end of the latter. Hook brackets 22 may be attached to the outer ends of arms 75 and 76, for the same purpose as brackets 22 of FIG. 3, while an angular bracket 23 may be attached to each of arms 75 and 76 adjacent the inner bar 78, each to support a clamp C which is constructed similarly to and operates in the same manner as clamp C of FIGS. 3 and 5. Thus, clamps C may be operated in unison by a rod 25 provided with a handle 26.

The frame F' includes a series of upright posts 88, 89 and 90, having a decreasing height corresponding to the inclination of the upper bar 77 of rack R". The posts 88, 89, and 90 may be mounted on top of panel 11, as by being attached to a flat bar, similar to bar 91 of frame F" of FIG. 11, which is bolted to the top of panel 11 and reinforced by gussets 92. At its upper end, each of the posts is provided with a collar 93 through which a rod 94 extends, on which is mounted a pair of hooks 95 which engage the outer bar 77 of the rack R' when in storage position, as in FIG. 8. Rod 94 is preferably journalled in collars 93 for limited pivotal movement and urged in a direction causing the hooks 95 to engage the rack, as by a coil spring 96 adjacent each hook 95, with one end of the coil spring engaging the adjacent post 88 or 90 and the opposite end engaging the hook 95. An arm 97, mounted on rod 94, is adapted to be moved upwardly, to release hooks 95 when the rack and the ladder thereon is to be moved from the storage position of FIG. 8 to the unloading position, shown in FIG. 9 after removal of the ladder, by a cam 98 mounted on a lever 99. Lever 99 is pivotally mounted on a pin extending between ears 100 attached to bar 77 and also moves between guides 101, extending outwardly from center arm 79. When in the position of FIG. 8, it is necessary only to push the lower or handle end of lever 99 inwardly toward arm 79, so that cam 98 will then move arm 97 upwardly and cause hooks 95 to disengage from the rack. This may be done by grasping the handle end of lever 99 and arm 79 and squeezing inwardly on the lever, so that as soon as the hooks 95 are released, the rack may be pulled outwardly and then moved downwardly to the position of FIG. 9, without releasing the grip on lever 99 and arm 79. Then, handle 26 may be utilized to release the clamps C, whereupon the ladder may be removed from the rack.

For replacing the ladder in storage position, the ladder is merely placed on brackets 22, then the clamps C engaged with the ladder and the rack moved upwardly to the position of FIG. 8. During such upward movement, springs 12 and 13 will assist the operator in moving the weight of the rack and the ladder upwardly. Also, during downward movement of the rack and ladder, springs 12 and 13 will tend to resist such movement, so that the ladder and rack do not fall as soon as moved outwardly, but the ladder and rack can be moved downwardly with a minimum of effort.

Figure 10:
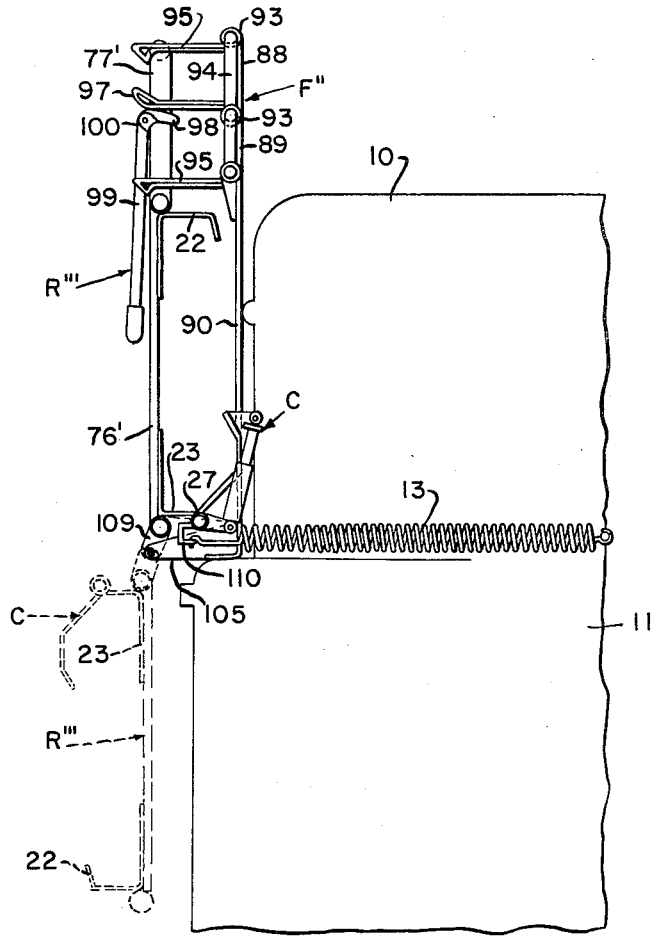
FIG. 10 is an end elevation of a modification of the device of FIG. 8 showing in dotted lines the position thereof corresponding to the position of FIG. 9.
Figure 11:
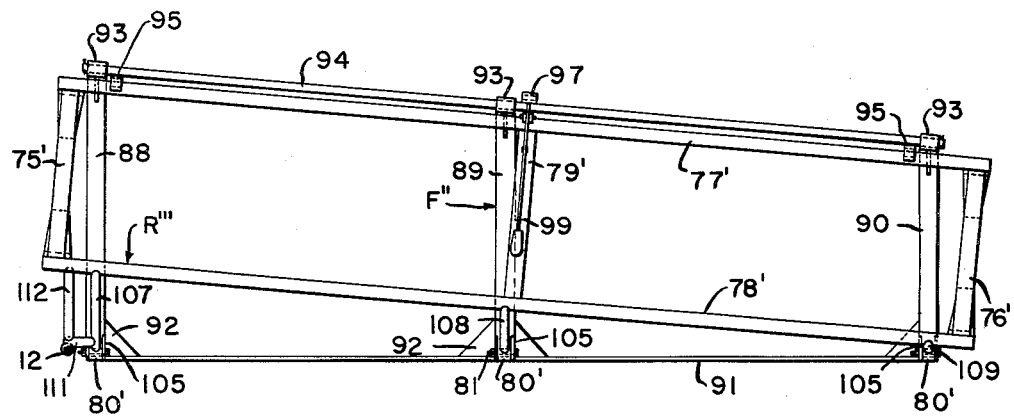
FIG. 11 is a side elevation of the device of FIG. 10.
Figure 12:
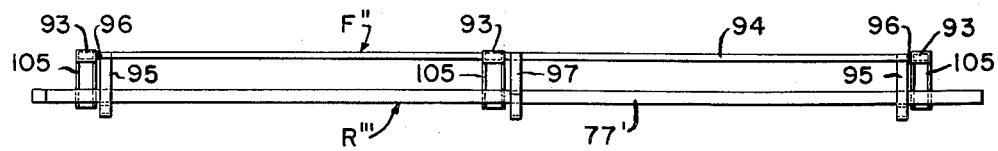
FIG. 12 is a top plan view of the device of FIG. 10.

In the modification of the device of FIGS. 8 and 9, illustrated in FIGS. 10-12, the frame F" is similar to frame F', except that a channel 105 extends outwardly from the lower end of each post 88, 89 and 90, the posts being mounted on strip 91 which may be attached, as by bolts, to the top panel 11 of FIGS. 8 and 9 and reinforced by gussets 92, as before. Also, a collar 93 may be mounted atop each post 88, 89 and 90, to receive the rod 94 on which are mounted hooks 95 and release arm 97. The rack R'" of FIGS. 10-12 includes outer and inner bars 77' and 78', between which are connected a front arm 75', a center arm 79' and a rear arm 76', the inner bar 78' and outer bar 77' each being slightly longer than frame F". The rack may be supported for pivotal movement by a front leg 107, a center leg 108 and a rear leg 109, of decreasing length, so that the rack R'" will be inclined upwardly toward the front. Thus, when a ladder is stored on the rack, the ladder will clear the cab of the vehicle in the same manner as shown in FIG. 8. Each of legs 107, 108 and 109 may be attached at its outer end to the inner bar 78' and provided at its inner end with a collar or bearing 80', which is pivotally mounted between the flanges of the respective channel 105, as by pin 81. The rack may also be provided with hook brackets 22 on one side and brackets 23, each supporting a clamp C, on the opposite side, in a manner similar to the rack of FIG. 9. The outer end of rear spring 13, as in FIG. 10, may be attached to an angle bracket 110 attached to a convenient portion of the corresponding bracket 23, such as one of the bearing portions 27. The outer end of front spring 12, as in FIG. 11, may be attached to a front bracket which includes an arm 111 extending forwardly and laterally from leg 107 adjacent the lower end thereof and a reinforcing arm 112 extending upwardly from the outer end of arm 111 to the inner bar 78'.

As will be evident, the operation of the ladder storage device of FIGS. 10-12 is similar to that of the device of FIGS. 8 and 9. Thus, with the ladder installed in storage position in the rack, as shown in full lines in FIG. 10, it will be necessary only to press the handle end of lever 99 toward the center arm 79' of FIG. 11, to cause cam 98 to push release arm 97 upwardly and thereby release hooks 95, whereupon the ladder and rack may move downwardly to the dotted position of FIG. 10. As before, clamps C may be released in the manner described previously and the ladder removed from the rack. After use, the ladder may be restored by placing it, on its side, in the hook brackets 22, then moving clamps C down against the upper edge of the ladder, and moving the rack to the upper or storage position of FIG. 10.

From the foregoing, it will be evident that the storage device of the present invention fulfills to a marked degree the requirements and objects hereinbefore set forth. In each of the forms illustrated and described, a rack on which may be mounted an elongated article, such as a ladder, is movable to a lower position which is easily accessible for placement of the ladder on the rack or removal of the ladder from the rack. In one form, the rack with the ladder thereon is moved to an upright position in which the rack and ladder are generally horizontal and are disposed above the vehicle, so as to clear a portion of the vehicle which may be higher than the portion on which the device is mounted, such higher portion usually being a cab. In another form, the rack is moved to an upright, generally vertical position, in which the rack with the ladder thereon is inclined upwardly, again so as to clear a higher portion of the vehicle, such as a cab. The resilient means urging the rack toward the upper position facilitates the movement of the rack from the lower to the upper position and also decreases the force required to prevent the rack and ladder from falling downwardly, during movement from the upper to the lower positions. By the use of means engaging one edge of the article and releasable clamping means engaging the opposite edge of the article, the ladder is readily placed in and removed from the rack, as well as being held securely on the rack for transportation or storage.

Although certain embodiments of this invention have been described and illustrated, it will be understood that other embodiments may exist and that various changes may be made therein, all without departing from the spirit and scope of this invention.

What is claimed is:

1. A device for storing an elongated article on a vehicle, comprising a rack including a plurality of arms pivotally connected at longitudinally spaced intervals along an upper portion of the vehicle, said arms being movable about a horizontal axis and extending outwardly at substantially right angles to the length of the vehicle during movement between a down position and a substantially upright position, said rack having a plurality of releasable clamping means at spaced intervals therealong for engaging said article to hold said article in position on said rack, said clamping means being interconnected for simultaneous movement of said clamping means between open and closed positions; stationary supporting means extending upwardly from said vehicle, one of said rack and said supporting means having at least one locking element thereon, and the other of said rack and said supporting means having means for engaging each said locking element so as to lock said rack in said upright position; and means for selectively releasing each locking element to unlock said rack for movement to the down position.

2. A device as defined in claim 1, wherein each said clamping means includes an angularly formed plate and spring biased toggle means associated with said plate and responsive to selective movement of said plate so as to urge said plate to open and closed positions.

3. A device as defined in claim 2, wherein said locking elements include spring operated bolt assembles having a bolt member normally biased to a locking position and means for moving said bolt away from said locked position; and said means engaging a locking element includes a member provided with an aperture for engagement with said bolt when said rack is disposed in the substantially upright position.

4. A device for storing an elongated article on a vehicle, comprising a rack mounted for pivotal movement about a longitudinal horizontal axis on said vehicle between a substantially vertical lower position alongside said vehicle and a substantially horizontal upper position above said vehicle; releasable clamping means on said rack for holding said article in position; a plurality of longitudinally spaced arms pivotally mounted on said vehicle and supporting said rack for said pivotal movement; a stationary substantially upright support mounted on said vehicle, said rack and support having cooperating locking elements for holding said rack in the upper position; resilient means connected to said rack and urging said rack toward said upper position; and means on said rack for releasing said locking elements to permit said rack to be moved to the lower position.

5. A device as defined in claim 4, wherein said support comprises lower end members extending transversely of said vehicle, said lower members being provided with means for pivotally mounting the inner ends of said rack arms and said lower members being provided with stop means for engaging said rack arms to limit the downward movement of said rack; upper transverse members at each end of said support; diagonally and downwardly extending struts connecting the ends of said upper members with the corresponding lower member, said support thereby being adapted to support a rack at each side of said vehicle; and means for attaching said support to said vehicle.

6. A device as defined in claim 4, wherein said resilient means comprises springs attached at one end to the respective arms, the opposite end of one said spring being attached to said frame at a point above the connection to said arm when said rack is in said upper position, and the opposite end of another of said springs being attached to a support generally below the connection to another said arm when said rack is in said upper position.

7. A device as defined in claim 4, wherein said rack comprises transversely extending members mounted on the respective arms at the outer ends thereof; a longitudinal member disposed centrally and connecting said transverse members; a hook shaped plate attached to one end of each of said transverse members and adapted to receive and engage said article at one edge thereof; an angular plate attached to the opposite end of each of said transverse members; an obtuse angular plate pivotally mounted on the outer end of each of said hook shaped plates; spring biased toggle means associated with each said obtuse angular plate for holding said plates in article engaging position or open position; and a rod operatively connected to each said spring biased toggle means, said rod being provided with a handle for manual operation of said toggle means.

8. A device for storing an elongated article on a vehicle, comprising a rack mounted for pivotal movement about a horizontal axis on said vehicle between a lower generally vertical position alongside said vehicle and an upper generally vertical position above said vehicle, said rack having releasable clamping means thereon for holding said article in position and a plurality of arms pivotally mounted on said vehicle and supporting said rack for said pivotal movement; a stationary substantially upright frame mounted on said vehicle and having locking elements spaced along the length thereof, said locking elements releasably engaging said rack to hold said rack in the upper position; means including a lever mounted on said rack for releasing said locking elements to permit said rack to be moved to the lower position; and resilient means connected to said rack and urging said rack toward said upper position.

9. A device as defined in claim 8, wherein said vehicle is provided with a portion of greater height adjacent one end of said frame and rack; and wherein said rack supporting arms have different lengths with the longest arm being adjacent said higher portion of said vehicle, so that said rack will support said article in an angular position and a portion of said article extending beyond said rack adjacent said higher portion of said vehicle will be disposed above said higher portion.

10. A device as defined in claim 8, wherein said frame comprises a base for attachment to said vehicle atop the same; a series of upstanding posts mounted on said base and each provided with a bearing collar at the upper end thereof; a rod pivotally mounted in said bearing collars; at least two hook members attached to said rod and extending transversely therefrom so as to engage said rack; resilient means urging said hook members toward said rack; and an arm mounted on said rod and extending transversely therefrom; and wherein said lever mounted on said rack is provided with a cam for engaging said rod arm to release said hook members.

11. A device as defined in claim 8, wherein said rack comprises a transverse arm at each end, one arm being longer than the other; a pair of members extending longitudinally between said arms in spaced, generally parallel relation; a bar extending centrally between said parallel members and parallel to said arms, said lever for releasing said locking elements being mounted on said central transverse bar; a hook shaped plate attached to the outer end of each said arm and engageable with said article at one edge thereof; an angular plate attached to each arm adjacent the inner longitudinal member; an obtuse angular plate pivotally mounted on the outer end of each said angular plate; spring biased toggle means associated with each said obtuse angular plate for holding said plate in a position clamping said article at the opposite edge thereof and a position spaced from said article; means for simultaneously moving said spring biased toggle means and obtuse angular plates between the different positions thereof simultaneously; a bracket for attachment of resilient means at one end of said rack and connected to the shorter end arm; and a bracket at the opposite end of said rack for attachment of resilient means and connected to the longer end arm and spaced between the inner end thereof and the inner longitudinal member, said bracket extending longitudinally, then transversely but at an angle to the axis of said end arm.

12. A device as defined in claim 8, wherein said rack comprises a pair of spaced, parallel inner and outer longitudinally extending members; a bar extending transversely between said members at each end and at the center thereof; a series of arms connected to the inner of said members and pivotally mounted on said vehicle, said series of arms being of unequal length so that the longitudinal axis of said rack will be disposed at an angle to the axis of pivotal movement thereof; a hook shaped plate attached to each of said end bars and said outer longitudinal member; an angular plate attached to the inner end of each of said end bars and the inner longitudinal member; an obtuse angular plate pivotally mounted on the outer end of each said angular plate; spring biased toggle means associated with each obtuse angular plate for holding said obtuse plate in engagement with an article at the opposite edge thereof and a position spaced from said article; means for simultaneously moving said spring biased toggle means and said obtuse angular plates between said different positions; a bracket for attachment of resilient means at one end of said rack and connected to the angular plate at said end; and a bracket at the opposite end of said rack including a member extending longitudinally outwardly from the supporting arm and then transversely to said inner longitudinal member.

13. A device as defined in claim 8, wherein said resilient means comprises a tension spring connected to said rack at each of the opposite ends thereof, one said spring being connected to said rack at a lesser distance from the pivotal axis of said rack than the other said spring.

14. A device for storing an elongated article on a vehicle, comprising a longitudinally elongated rack pivotally mounted on said vehicle for movement about a longitudinal axis, between a down position and a substantially upright position above at least a portion of said vehicle; clamping means on said rack for holding said article in fixed position; stationary supporting means extending upwardly from said vehicle; longitudinally spaced locking elements on one of said rack and said supporting means; means for engaging said locking means on the other of said rack and said supporting means for locking said rack in said upright position; and releasing means operatively connected to said locking elements for simultaneously releasing said rack for movement to said down position.

15. A device for storing an elongated article on a vehicle, as set forth in claim 14, wherein said rack moves through an angle of at least 90° between said upright position and said down position.

16. A device for storing an elongated article on a vehicle, comprising a longitudinally elongated rack pivotally mounted along an upper portion of said vehicle for movement about a longitudinal horizontal axis between a down position and a substantially upright position above at least a portion of said vehicle; fixed means on said rack for engaging one side of said article; releasable clamping means on said rack for engaging the opposite side of said article; stationary supporting means extending upwardly from said vehicle; longitudinally spaced locking elements on one of said rack and said supporting means; means for engaging said locking elements on the other of said rack and said supporting means for locking said rack in said upright position; and releasing means independent of the movement of said rack and operatively connected to said locking elements, for simultaneously releasing said locking elements to unlock said rack for movement to said down position.

References Cited in the file of this patent

UNITED STATES PATENTS

| | | |
|---|---|---|
| 2,080,527 | Bixel | May 18, 1937 |
| 2,100,971 | McDonald | Nov. 30, 1937 |
| 2,237,853 | Troche | Apr. 8, 1941 |
| 2,292,386 | Manson | Aug. 11, 1942 |
| 2,318,971 | Roumage et al. | May 11, 1943 |
| 2,573,187 | Desilets | Oct. 30, 1951 |
| 2,733,039 | Balogh | Jan. 31, 1956 |
| 2,746,628 | Neyra | May 22, 1956 |
| 2,926,405 | Moesch | Mar. 1, 1960 |